United States Patent
Ellens

(10) Patent No.: US 7,306,089 B2
(45) Date of Patent: Dec. 11, 2007

(54) SKILLET POWER SYSTEM

(75) Inventor: Dan Ellens, Plymouth, MI (US)

(73) Assignee: Jervis B. Webb Company, Farmington Hills, MI (US)

(*) Notice: Subject to any disclaimer, the term of this patent is extended or adjusted under 35 U.S.C. 154(b) by 172 days.

(21) Appl. No.: 11/345,958

(22) Filed: Feb. 2, 2006

(65) Prior Publication Data

US 2007/0175732 A1    Aug. 2, 2007

(51) Int. Cl.
*B65G 47/04* (2006.01)

(52) U.S. Cl. .......... 198/465.3; 198/580; 198/795; 191/45 A

(58) Field of Classification Search ......... 198/343.2, 198/345.3, 465.1, 465.2, 465.3, 580, 795; 104/172.1, 172.2, 172.3, 172.4; 191/45 A, 191/45 R
See application file for complete search history.

(56) References Cited

U.S. PATENT DOCUMENTS

| | | | |
|---|---|---|---|
| 363,783 A | 5/1887 | Warren | |
| 698,040 A | 4/1902 | Mietaschk | |
| 2,634,851 A | 4/1953 | Steinhoff | |
| 2,816,643 A | 12/1957 | Klamp | |
| 2,844,241 A | 7/1958 | King | |
| 2,883,942 A | 4/1959 | Johnson | |
| 3,134,489 A | 5/1964 | Gillham | |
| 3,338,429 A | 8/1967 | Zetzsche | |
| 3,415,200 A | 12/1968 | Bishop et al. | |
| 3,511,187 A | 5/1970 | Hanna | |
| 3,518,946 A | 7/1970 | Kavieff | |
| 3,581,670 A | 6/1971 | Larivee | |
| 3,707,923 A | 1/1973 | Woodling | |
| 3,810,428 A | 5/1974 | Klamp | |
| 3,948,186 A | 4/1976 | McCaul | |
| 4,144,818 A | 3/1979 | Fletcher | |
| 4,284,188 A | 8/1981 | Gram | |
| 4,438,701 A | 3/1984 | Murai et al. | |
| 4,440,090 A | 4/1984 | Murai et al. | |
| 4,548,135 A | 10/1985 | Kupczyk | |
| 4,564,100 A | 1/1986 | Moon | |
| 4,616,570 A | 10/1986 | Dehne | |
| 4,645,885 A | 2/1987 | Blesinger | |
| 4,646,650 A | 3/1987 | Kondo et al. | |
| 4,646,915 A | 3/1987 | Ohtaki et al. | |
| 4,669,388 A | 6/1987 | Dehne et al. | |
| 4,745,865 A | 5/1988 | Dehne | |
| 4,771,697 A | 9/1988 | Dehne | |
| 4,811,685 A | 3/1989 | Murai | |
| 4,924,777 A | 5/1990 | Linton et al. | |
| 4,944,229 A | 7/1990 | Arakawa et al. | |
| 4,947,978 A | 8/1990 | Rhodes | |
| 5,012,917 A | 5/1991 | Gilbert et al. | |
| 5,013,203 A | 5/1991 | Wakabayashi | |
| 5,195,630 A | 3/1993 | Donovan et al. | |
| 5,253,745 A | 10/1993 | van den Bergh et al. | |
| 5,318,167 A | 6/1994 | Bronson et al. | |

(Continued)

*Primary Examiner*—James R. Bidwell
(74) *Attorney, Agent, or Firm*—Dickinson Wright PLLC

(57) ABSTRACT

The invention relates to conveyor systems with skillets adapted with connectors to enable power to be conveyed between skillets that are abutted together along a production area. With the skillets being electrically connected, the conductor only needs to supply power the electrical receiving device of a single skillet at any given time. The conductor in turn can be limited to a length of about one skillet, which reduces the wear, as well as installation, repair and maintenance costs.

19 Claims, 2 Drawing Sheets

U.S. PATENT DOCUMENTS

| | | |
|---|---|---|
| 5,449,056 A | 9/1995 | Ross |
| 5,503,259 A | 4/1996 | Clopton et al. |
| 5,517,922 A | 5/1996 | Summa et al. |
| 5,547,090 A | 8/1996 | Richter |
| 5,549,050 A | 8/1996 | Rhodes |
| 5,556,466 A | 9/1996 | Martin et al. |
| 5,577,593 A | 11/1996 | Hooper |
| 5,669,309 A | 9/1997 | Carlton et al. |
| 5,741,985 A * | 4/1998 | Gaete .................... 198/345.3 |
| 5,839,567 A | 11/1998 | Kyotani et al. |
| 6,008,476 A * | 12/1999 | Neiconi et al. .......... 198/465.3 |
| 6,047,813 A * | 4/2000 | Herzog et al. ........... 198/465.3 |
| 6,155,405 A * | 12/2000 | Siebenmann et al. ....... 198/795 |
| 6,161,483 A | 12/2000 | Lipari et al. |
| 6,202,809 B1 * | 3/2001 | Paek ........................ 191/45 A |
| 6,494,142 B2 * | 12/2002 | Masugaki et al. ........ 198/465.3 |
| 6,494,304 B1 | 12/2002 | Jaynes et al. |
| 7,178,660 B2 * | 2/2007 | Dehne et al. ............ 198/463.1 |

* cited by examiner

SKILLET POWER SYSTEM

FIELD OF THE INVENTION

The present invention is directed to a conveyor system having a plurality of skillets adapted to be abutted together to form a moving platform upon which production tasks can be performed, and in particular to a conveyor system where electrical power or data signals can be provided between each skillet, and between each skillet and a controller or power source.

BACKGROUND OF THE INVENTION

Manufacturing facilities, such as automobile assembly plants, use moving skillets to convey large parts throughout the facility. The skillets are commonly larger than the workpiece to provide a platform for a worker to perform production tasks while the skillet is in motion. In other words, the skillet may form a moving floor, allowing the worker to perform a production task while moving with the skillet and workpiece. When the production task is complete, the worker may leave the skillet by walking to an adjoining skillet or stepping from the skillet to the floor of the facility or to a platform adjacent to the skillets. The skillet typically moves along a predetermined path in a pit and the upper surface of the skillet is generally somewhat aligned with the floor of the facility or a platform extending along at least portions of the skillet path.

While assembly plants have multiple designs, one common design is to have the skillet assembly (skillet and coupled workpiece) move through multiple production and delivery areas. More specifically, the skillet assembly is commonly moved from production area to production area until all of the assembly steps are completed. The workpiece is then separated and the skillet is returned to the start of the assembly line. Each production area is typically dedicated to a particular production task, or series of tasks, wherein the length of each production area, speed with which the skillet moves through the production area, and the type of mechanical equipment and tools needed depends on the nature and number of tasks assigned to that production area.

The skillets are brought together in production areas to form a continuous moving platform, floor, or "train" upon which the production tasks can be performed. The front and back ends of each skillet are typically adapted to adjoin the back and front ends of adjacent skillets. Having the skillets abutted together in production areas enables workers to move around the workpieces, as well as from skillet to skillet, to efficiently accomplish the tasks assigned to that production area.

The multiple production areas may be separated from one another by delivery areas to facilitate part storage, walkways, and other effective use of floor space between each production area. Once the skillet assemblies pass through the production area, the skillets typically enter a delivery area where they are separated and moved to the next production area. Separate accelerating drives can also be provided to move the skillets from the production area to the delivery area and to establish proper spacing between adjacent skillets in the delivery areas. In delivery areas, the skillet assemblies may be spaced a predetermined distance from one another, allowing faster speeds and fewer required skillets and thereby lowering the cost of the system through limiting the total number of skillets. The system may include various indexing stations, accelerators, and decelerators in the delivery area to provide proper skillet spacing and speed. Indexing in the delivery areas allows the skillets to enter each production area in a timely manner so that the next production area continually receives skillets to keep the skillets in the next production area moving at the desired rate. An accumulation of skillets known as "float" before the skillets enter the next production area is also helpful in preventing downstream production areas from stopping, even momentarily, due to a lack of skillets. The float allows for upstream production areas to stop the skillets while tasks are performed or to temporarily stop movement of the skillets in the production area to fix a problem without disrupting a downstream production area.

Each of the above components requires drive, safety, and control units to ensure proper delivery of each skillet assembly to and through the respective production areas. Friction drive assemblies, such as drive wheels that engage the sides of the skillets, are commonly provided at or near the entrance to each production area, to convey each skillet assembly into and through the production area at a predetermined speed. With skillets abutted together, the entire train of skillets may be driven by a single drive mechanism engaging a single skillet, i.e., one skillet can push downstream skillets in the production area. Return or retarder drives, typically located at the end of a production area, are often provided to ensure, if necessary, that the skillets are kept abutted to one another and do not separate as they travel through the production area.

One feature common among skillets in production facilities is the need to have electrical power for completing production tasks. It is typical for each skillet to have electrical power throughout the production area to power various electrical equipment, such as, tools, lifts, current disconnects, controls, diagnostic lights or indicators, tool plug-in outlets, clamps, compressors, pumps, emergency stops, or any other necessary or helpful electrical tool. In conventional conveyor systems, an electrical conductor, such as an electrified rail, is commonly run along the entire length of the conveyor path within the production area. This conductor is commonly underneath the skillets, supplying power to the moving skillets. The skillets each include a power receiving device, such as a connector shoe, extended from the skillet that engages the conductor to receive the electrical power. To continuously supply power to the skillet, the collector shoe must continuously contact the conductor throughout any period that requires the skillet to be electrically powered. To continuously supply electrical power throughout the production area, the conductor is extended the entire length of the production area so that each collector shoe always stays in contact with the conductor along the entire length of the production area. One drawback common to these systems is increased manufacturing costs due to excessive conductor lengths. The extended length of the conductor also increases the total friction of the system, as each collector shoe stays engaged on the conductor throughout the production area, requiring more powerful drive systems, especially in long production areas. Furthermore, the collector shoes staying engaged on the conductor throughout the length of the production area also increases wear of the collector shoes and conductor, increasing replacement, maintenance, and repair costs.

Therefore, there is a need for a system with less manufacturing, installation, replacement, and maintenance costs that still allows the skillets to be abutted together in the production area and have power supplied to each skillet in the production area. More specifically, there is a need for a system that eliminates the necessity of having a conductor that extends the length of each production area and reduces wear associated with the multiple collector shoes being in contact with the conductor along the entire production area.

SUMMARY OF THE INVENTION

The present invention relates to a conveyor system having skillets for supporting workpieces that are adapted to be brought together along a predetermined path. Each of the skillets includes electrical connectors located on or adjacent to the ends of the skillet, which may be coupled to the adjoining skillets to electrically connect each skillet. With each skillet being electrically connected, electrical power may be transmitted to adjacent skillets and along each connected skillet in a production area. The connectors may also transmit data signals in combination with or separately from the electrical connector. The electrical connector at each end of the skillet is illustrated as a male connector at one end, and a female connector at the other end, although any connector that allows passage of electrical power and/or data signals to the adjacent skillet may be used.

An electrical cable may be extended between the connectors on each skillet. Electrical power can then be conveyed from one end of the skillet to the other end of the skillet. Various electrical service stations or outlets located on the skillet may connect to the cable to receive power to operate tools or equipment. When the skillets are brought together, electrical power transmitted to just one skillet in the production area can be transmitted to all of the electrically connected skillets. Similarly, a data cable may extend separately between connectors on each end to allow passage of data signals from one end of the production area to the other end.

To further lower manufacturing costs, only certain skillets may include an electrical receiving device, such as every other skillet; however, in the illustrated embodiment, each skillet includes one. In view of the above, only one electrical receiving device on the skillet needs to make contact with and receive electrical power from a conductor located along the production area to provide electrical power to all abutted skillets within that production area.

Any variety of styles of conductors known in the art for providing electricity to an electrical receiving device on the skillet may be used. As illustrated in the Figures, the conductor is preferably a conventional open-type conductor, such as used to power monorails, located along the conveyor path. While the location may also be varied as desired, the conductor is illustrated in the figures as being underneath the skillets.

Another aspect of the present invention is that the above system allows the length of the conductor to be limited to approximately that of about a single skillet, if each skillet includes an electrical receiving device. That is, if the length of a production area is 10 skillets, the conductor of the present invention only has to be about the length of one skillet or slightly greater, because contact between the conductor and any electrical receiving device will transfer the power to that skillet and any connected adjacent skillets. The actual required distance of the conductor is the length that would ensure that the conductor maintains continuous contact with at least one collector shoe on one skillet along the train of skillets at any given time. The conductor may also be located at any point along the production area and is not limited to a certain spot, such as the beginning of the production area, thereby making installation of the system easier along with lower installation costs. Instead of minimizing the conductor to approximately the length of a single skillet, the conductor may, for example, extend approximately the length of two skillets, thereby allowing every other skillet to include a collector or electrical receiving device. In some installations, a combination of a reduced conductor and limiting the number of skillets with collectors will provide the lowest manufacturing, installation, and maintenance costs.

Reducing the length of the conductor also reduces the friction wear that occurs between the electrical receiving devices or collector shoes and conductor and therefore reduces wear on the entire system. Manufacturing and installation costs associated with the conductor, as well as replacement, maintenance and repair costs, are also lowered. Maintaining and repairing skillets can be made easier because the skillets can be easily removed due to limited journaling of the collector shoes on the conductor.

As discussed above, another aspect of the present invention is that the connectors may also allow the passage of data signals from one skillet to another. While every skillet may have a data receiving/sending device, the interconnection and intercommunication of the skillets through the connectors allows only one skillet in the production area to have the sending/receiving data unit, which reduces manufacturing, assembly, installation and maintenance costs. The sending/receiving unit may be any unit known in the art for communication with an external controller or recorder, such as wirelessly or by a data conductor and data pickup. For example, if the smallest production area is only ten skillets, a skillet including the data sending/receiving unit could be spaced every nine skillets, ensuring that each production area always has one unit in communication with a controller. It should also be readily recognized by one skilled in the art that the present invention may be operable with only electrical connectors and no data connectors, only data connectors and no electrical connectors, and both electrical and data connectors. To further reduce costs, the data signals can also be sent over the electrical system, further combining the functions and eliminating the need for additional parts.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

DETAILED DESCRIPTION OF THE PREFERRED EMBODIMENT

Figure 1:
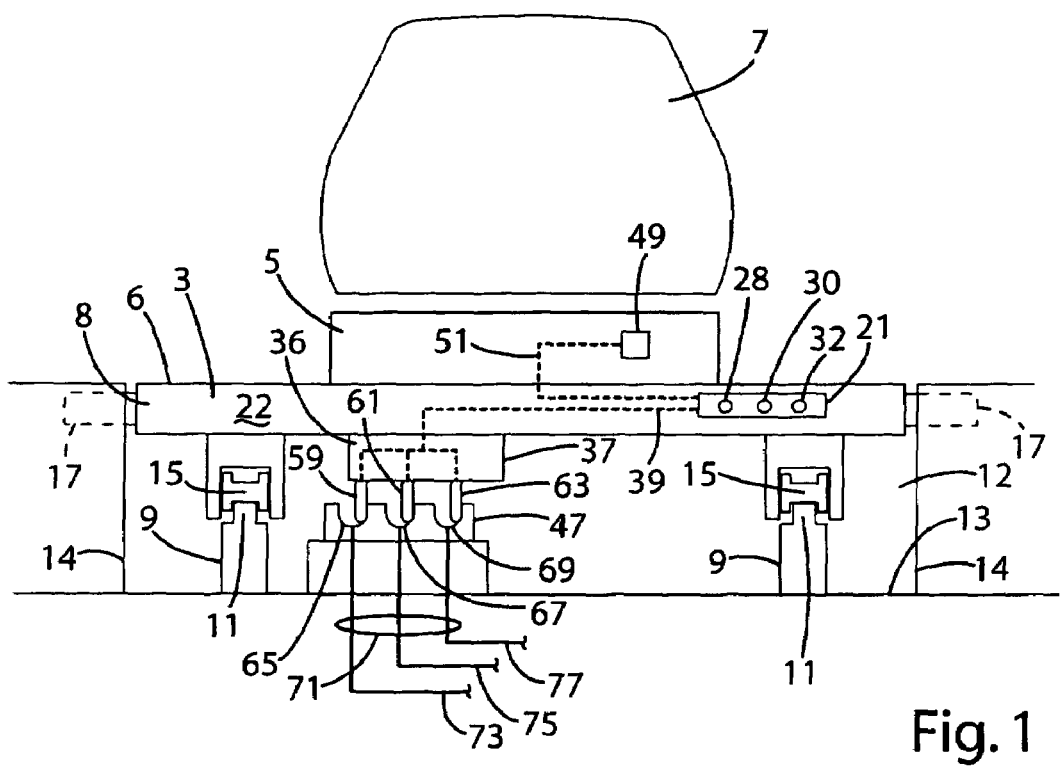
FIG. 1 is an end view of an exemplary skillet with a collector shoe engaging a conductor.
Figure 2:
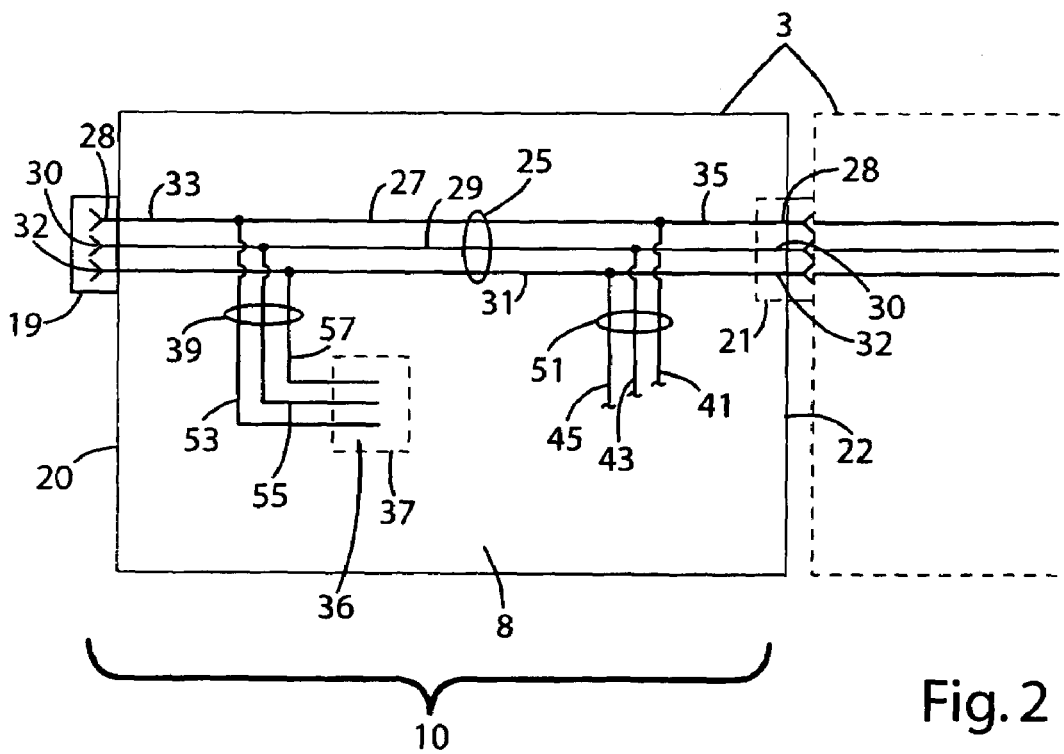
FIG. 2 is a schematic drawing showing an exemplary electrical wiring in a skillet.

The present invention is directed to a skillet 3 for supporting a workpiece 7, as illustrated in FIG. 1. The skillet 3 generally includes a platform 8 having an upper surface 6 and an upper support 5 extending from the platform 8 and adapted to support thereon a workpiece 7. The workpiece 7 is illustrated in the drawings as an automobile body; however, it could be any other item needing assembly. Each skillet 3 includes an electrical assembly 10, as illustrated in FIG. 2, having at least one contact 29 for engaging a contact on an adjacent skillet to allow the passage of electrical power, and if desired, data signals between adjacent skillets. While the present invention is described below in detail for the passage of electricity, the present invention may transmit data signals instead.

The conveyor assembly 2 may have a variety of configurations, depending on the type of workpiece, production tasks to be performed, the facility, and a variety of other considerations. The basic design, structure, and configuration of the skillets 3, excluding the electrical assembly 10 of the present invention, are generally well known in the art. Any skillet 3 that is suitable for supporting a workpiece 7, and where it is advantageous to provide electrical power or data signals from one skillet to an adjacent skillet may use the present invention.

The skillet 3 is illustrated in the Figures as including a platform 8 which may be a frame or a frame with an upper surface 6 allowing workers to move around the workpiece 7. Of course, other types of skillets, including a flat frameless skid, may be used. While the upper surface 6 has been illustrated as extending substantially horizontally, any other shape helpful to the worker in completing a production task may be used. The skillet 3 also has a front end 20 and a back end 22. As discussed in further detail below, the skillet 3 includes the electrical assembly 10 having a front connector 19 located on or adjacent to the front end 20 and a rear connector 21 on or adjacent to the rear end 22. The skillet 3 further includes an electrical receiving device or collector 36 which is part of the electrical assembly 10.

The skillet 3 may be supported and moved by a variety of methods. Exemplary methods include wheels on the skillet 3 supported by a support surface such as a rail, rollers coupled to a support surface that engage and support a frame or a skid on the skillet, or any other method of moving a skillet having a workpiece thereon. The skillet 3 is illustrated in the figures as being movably supported on a conveyor track 9, such as a pair of rails 11 extended parallel to each other along a pit floor 13. Wheels 15 extend downward from the bottom of the skillet 3 to engage rails 11. The wheels 15 are illustrated as being flanged to help the skillet 3 stay on the rails 11. The use of rails 11 and a flanged wheel 15 is helpful in aligning the skillets with each other, although wheels engaging the sides of the skillets or other configurations could perform the same function. The system can be powered by any type of conveyor system and is illustrated in the figures as a conventional friction drive system.

The skillet 3 is schematically illustrated in FIG. 1 as being driven by powered friction drive wheels 17 extending from the side walls 14 to engage the sides of the skillet 3. If one set of drive wheels 17 are to drive the skillet 3 through a production area, the drive wheels 17 are preferably located at or near the entrance of each production area. Placing a retarder drive or other friction device at the end of the production area (not illustrated) helps ensure that the skillets 3 stay tightly abutted. When skillets 3 in the production area are abutted against each other, a single set of drive wheels 17 can be provided at or near the entrance of the production area, to drive and push all of the other skillets 3 in the train, i.e., those that are in front of the skillet being driven. While only one drive wheel may be used, to further assist in aligning the skillets, an opposing wheel is generally also used which may be a free or a drive wheel.

A separate drive mechanism (not shown) can be provided at the end of the production area (or beginning of the next delivery area) to cause the skillets 3 that have passed through the production area to travel at different speeds and spacings, as needed. A return or retarder drive wheel (not shown), which helps to keep the skillets 3 together in the production area, can also be provided near the end of the production area, although is not needed if the skillets 3 can be connected together by other means, such as a latching mechanism.

Figure 3:
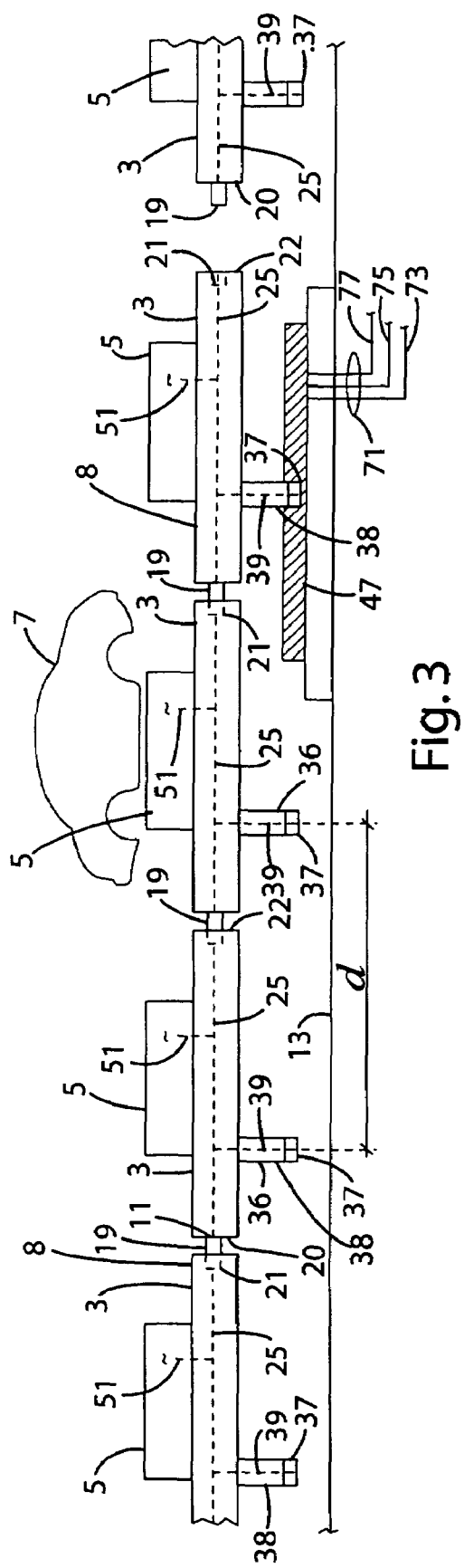
FIG. 3 is an exemplary side view of a plurality of skillets aligned and abutted together along a production area of a conveyor path, wherein the connectors on each skillet, except the first skillet which has not yet entered the production area, are connected together, and one of the collector shoes on one of the skillets is in contact with the conductor.
Figure 4:
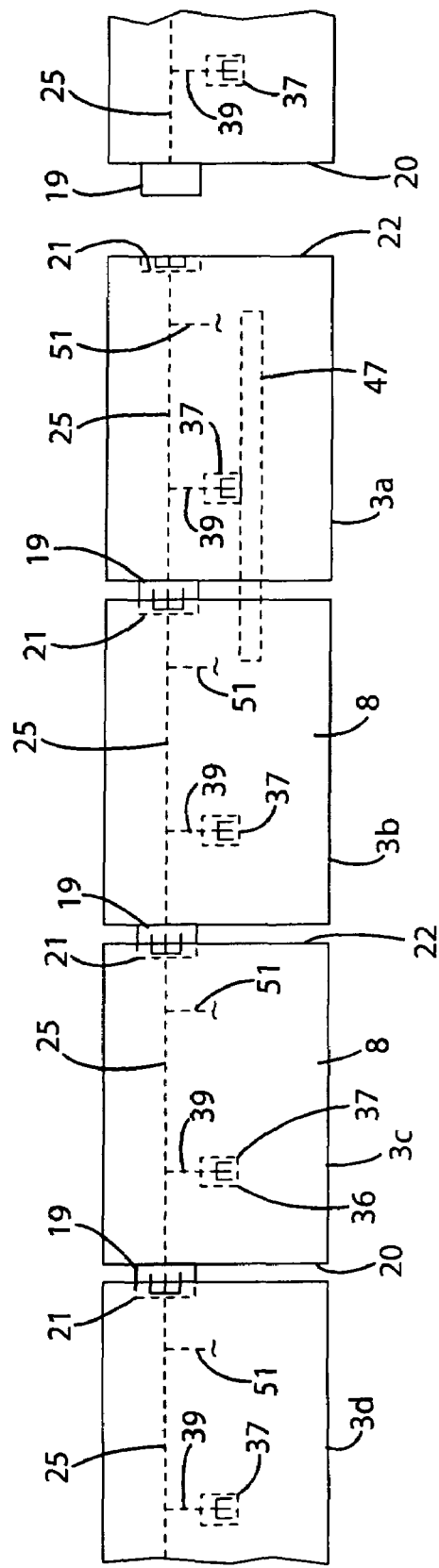
FIG. 4 is an exemplary overhead schematic view of the plurality of skillets shown in FIG. 3.

As shown in FIGS. 2-4, each skillet 3 includes the electrical assembly 10 having the front connector 19 at the front end 20 of the skillet 3, and the back connector 21 at the back end 22 of the skillet 3. When the skillets 3 are placed adjacent to each other, the front connector 19 of one skillet 3 can engage and mate with the rear connector 21 of the adjacent skillet. While the electrical assembly 10 is primarily discussed in relationship to the passage of electricity to power various kinds of electrical equipment, the electrical system can easily be used to communicate data signals, or a separate data system (not shown) may be added to the skillet, having similar characteristics and features to the electrical assembly defined herein that is capable of carrying electrical power or data.

The connectors 19 and 21 can be designed using any configuration that is capable of transferring power or data from one skillet 3 to an adjacent skillet 3. The connectors 19 and 21 are illustrated in FIGS. 2-4 as being male and female plugs. Of course, as an example (not illustrated), a flat metal plate on each skillet, which become electrically connected when adjacent skillets are brought together, may be used. If a flat metal plate is used for the connectors, to allow for some relative movement of adjacent skillets, the plates may be spring loaded to stay engaged even when some separation between adjacent skillets occurs. If male and female connectors 19 and 21 are used, as illustrated in the figures, to ensure continuous power or data transfer between adjacent skillets 3, the plugs are preferably designed to allow some separation between the skillets 3. Furthermore, if the illustrated plugs 19 and 21 are used, they may include a self-holding capability to enable the connections to be maintained despite uneven movements of the skillets 3. For example, the plugs 19 and 21 may be mounted on a biasing assembly (not shown), such as a spring loaded biasing assembly that biases the plugs to a centered position, but allows lateral movement of the connectors 19 and 21 to compensate for relative movement of the skillets 3, such as when the skillets 3 become slightly misaligned. While the drawings show the male connector 19 to be on the front end 20, and the female connector 21 to be on the back end 22, it should be clear that the connectors 19, 21 can be reversed, so that the female connector is on the front end 20, and the male connector is on the back end 22, without departing from the present invention.

The connectors 19 and 21 may also be designed to be self-engaging and self-aligning. As adjacent skillets 3 are brought together by the system's drive mechanisms, i.e., at or near the entrance of the production area, the connectors 19 and 21 may include self alignment features, such as tapered surfaces on the male and/or female connectors to ensure engagement of the connectors. Of course, any other self aligning feature may be used to help guide each male connector 19 into each corresponding female connector 21. If necessary, the connectors 19, 21 can be provided as separate mechanical guide structures (not shown). As the skillets 3 are typically well aligned by rails or the drive device, the need for self aligning features on the connectors 19 and 21 may be minimal.

The electrical assembly 10 of each skillet 3 has a cable 25 that extends between the two connectors 19, 21, and, as shown in FIG. 2, the number of power or data carrying wires depends on the type of power or data to be carried. The specific selection of the cable 25 is dependent upon the production needs and the environment in which the skillet operates. As illustrated in the figures, the cable 25 in an exemplary electrical supply system has positive, negative and ground wires, 27, 29, 31, respectively. While the routing of the cable 25 also depends on the specifics of the skillets 3 production requirements and as such, the cable 25 is schematically shown in the figures as passing directly from one end 20 of the skillet to the other end 22. Each cable 25 generally has an end 33, 35 that terminates at the connectors 19 and 21, respectively. In the illustrated example, the individual wires, 27, 29, 31 also each terminate into individual contact surfaces 28, 30, 32 for conveying positive, negative and ground.

As discussed above, to receive power from a conductor 47, each skillet 3 preferably has a collector or electrical receiving device 36. The collector 36 may be formed in any configuration capable of transmitting power from a source to the skillet 3, but is illustrated in FIGS. 1, 3 and 4 as a collector shoe 37 on the end of a shaft 38. The collector shoe 37 can be formed in any configuration, and is shown as engaging the conductor 47, specifically conducting surfaces 65, 67, 69 on the conductor 47 with contact members 59, 61, and 63. Of course, one skilled in the art would recognize that the specific configuration of the conductor 47 and collector 36 may vary as needed. The collector 36 includes a collector cable 39 electrically connecting the cable 25 with the collector shoe 37. The collector cable 39 may have various configurations, such as different wires, wire sizes and such as needed to accommodate different voltages requirements and configurations or different data configurations. As illustrated in FIGS. 1 and 2, the collector cable 39 may include a positive wire 53 electrically connected to the positive wire 27 of the cable 25, a negative wire 55 electrically connected to the negative wire 29 of the cable 25, and a ground wire 57 electrically connected to the ground wire 31 of the cable 25. With the skillets 3 abutted, power passing from the conductor 47 through the collector 36 can be passed through the cable 25, and connectors 19, 21 to each electrically connected skillet 3 in the train of skillets. As shown in FIG. 4, when the skillets 3 are abutted and connected together to form a continuous train, power or data can be fed to one skillet 3a, and then conveyed to the other connected skillets 3b, 3c, 3d, etc., and by virtue of the connectors 19 and 21 on each skillet being in contact with each other. The collector 36 is illustrated as extending downwardly from the skillet 3 to engage a conductor 47, such as a power rail or third rail; however, any other method may be used, including extending upward to engage overhead wires, or to the side of the skillet 3. The selection of the conductor 47 and collector shoes 37 preferably takes into account a variety of criteria, including, without limitation, the size of the average draw for the specified system, the number of skillets and the load requirements for each skillet. Other considerations may include selecting conductors 47 and collector shoes 37 that are compatible with each other, and which enable proper contact to be made even if slight misalignment occurs. For example, spring loaded mechanisms can be provided on the conductor 47 and/or collector shoes 37 to help achieve proper mating as the collector shoes 37 engage the conductor 47, wherein the springs are preferably flexible enough to accommodate anticipated misalignment at the entry point. The conductor 47 is connected to a power source (not shown) by a power cable 71, also in the illustrated example having positive, negative and ground wires, 73, 75, 77, respectively.

Each skillet 3 may be provided with electrical work stations or outlets 49 that can provide power to various equipment and tools needed to perform production tasks on the workpiece. On each skillet 3, the stations or outlets 49 may be electrically connected to sub-cables 51, which are in turn connected to cable 25. Power may spread out through the skillet 3 along a single sub cable 51, or multiple sub-cables to electrical outlets 49 or equipment such as electrical lifts. Sub-cable 51 is illustrated as having positive, negative and ground wires, 41, 43, 45, respectively, but of course any other desired configuration may be used. If the sub-cable 51 carries data signals, any other type of data cable may also be used, depending on the type of signal and data outlet or port.

Because power can be transmitted between adjacent skillets 3, the conductor 47 of the present invention does not have to extend the length of an entire production area, as in past systems. Instead, the length of the conductor 47 can be limited to that of about one skillet 3, or at least the distance between adjacent collector 36 on adjacent electrically connected skillets 3, shown as length "d" in FIG. 3. When the skillets 3 move past the conductor 47, at least one collector 36 will be in constant contact with the conductor 47, and before collector 36 disengages the conductor 47, the next collector 36 on the next adjacent skillet 3 will engage the conductor 47. This way, continuous power can be supplied to all of the connected skillets 3, without each collector 36 on each skillet 3 being in constant contact with the conductor 47.

As a means of developing the system for any given application, all of the connectors, cables, contact surfaces, outlets, service stations, etc., are preferably selected and sized to accommodate the current loads, amperage requirements or data requirements that are anticipated by the system, including the load requirements for each skillet, and the number of skillets that are to be used. The connectors and cables, etc., should also be adapted and located so that they do not interfere with other operating mechanisms and functions of the skillets, tracks, etc.

As seen in FIGS. 3 and 4, the present invention is intended to be used with at least two skillets 3 traveling along a conveyor path and abutted against each other to form a moving platform or train upon which production tasks can be performed. In use, at the entrance of a production area, the skillets 3 will be brought together, which causes the connectors 19, 21 on adjacent skillets 3 to be connected. Self-alignment features, as discussed above, and/or latches, 85, 87, help to keep the skillets 3 and connectors 19, 21 connected as they travel through the production area.

As the skillets 3 move forward, a collector 36 on one skillet 3 engages the conductor 47, such as by a collector shoe 37, and stays in contact with the conductor 47. Before that collector 36 disengages the conductor 47, the next adjacent collector 36 will engage the conductor 47. This way, continuous power can be supplied to at least one skillet 3 in the train. Power is then transmitted through the collector 36 of that one skillet 3 to all of the other skillets 3 that are electrically connected to that one skillet 3 in the train. This way, power can be supplied to every skillet 3 in the production area, without requiring the conductor 47 to be in constant contact with each collector 36 of every skillet 3 in the train.

While the preferred embodiment of the present invention comprises skillets 3 that can be moved along a conveyor path to support workpieces thereon, it should be noted that any type of movable platform or surface, such as a trolley, wherein it is desirable to provide electrical power thereto, and enable the platforms or surfaces to be joined together along the conveyor path, is within the contemplation of the present invention.

Of course, the first and second connectors 19 and 21 are capable of transmitting data signals when desired. The conductor 47 or a wireless assembly may transmit data to the collector 36 or a wireless receiving device (not shown) for communication along the cable 25 and in turn to any item on the skillets 3 that need to send or receive data.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A conveyor system for supporting workpieces thereon, comprising:
    a plurality of skillets, each having a first end and a second end, and adapted to travel along a predetermined path; and
    a first connector on said first end, and a second connector on said second end, said skillets being adapted to be abutted against each other such that said first connector of one skillet can be connected to said second connector of an adjacent skillet and wherein said first and second connectors are capable of being electrically connected to allow electricity to pass between said first and second connectors.

2. The conveyor system of claim 1 further including a cable in electrical communication with said first and second connectors.

3. The conveyor system of claim 2 further including an electrical receiving device electrically connected to said cable.

4. The conveyor system of claim 3 further including a conductor extended along said predetermined path and electrically engaging said electrical receiving device.

5. The conveyor system of claim 4 wherein said conductor has a predetermined length, said predetermined length being at least equal to or greater than the distance between adjacent electrical receiving devices when said skillets are abutted together along said path.

6. The conveyor system of claim 4 wherein said conductor is in contact with at least one receiving device at any given time.

7. The conveyor system of claim 3, wherein when said conductor contacts said electrical receiving device, each adjacent skillet is electrically connected to at least one skillet, and an electrical current is capable of traveling to each adjacent skillet.

8. The conveyor system of claim 1, wherein one or more electrical service stations or outlets are provided on each of said skillets, and said service stations or outlets are electrically connected to said cable.

9. The conveyor system of claim 1, wherein said first and second ends each have a self-alignment structure to allow said first and second connectors of said adjacent skillets to connect even when said skillets are misaligned along said path.

10. The conveyor system of claim 1 wherein said first connector is a male connector and said second connector is a female connector.

11. A conveyor system, comprising:
    at least two skillets, each adapted to support a workpiece thereon, wherein said skillets are adapted to travel along a conveyor path in an approximately abutted relationship;
    a first connector and a second connector located on each of said skillets, and wherein the first connector from one skillet is in electrical communication with the second connector of the other skillet when said skillets are in said approximately abutted relationship;
    a cable connected to and extending between said first and second connectors on each of said skillets; and
    an electrical receiving device on at least one of said skillets in electrical communication with said first and second connectors.

12. The conveyor system of claim 11 further including a conductor extending at least partially along said conveyor path and capable of engaging said electrical receiving device on one of said skillets.

13. The conveyor system of claim 12 wherein said conductor has a predetermined length sufficient to enable said conductor to be in contact with at least one electrical receiving device on one of said skillets when said skillets are abutted.

14. The conveyor system of claim 13, wherein said predetermined length of said conductor is at least as great as the distance between adjacent electrical receiving devices.

15. The conveyor system of claim 11, wherein said conveyor path includes a production area having a production length and wherein said predetermined length of said conductor is shorter than the production length.

16. The conveyor system of claim 12 further including at least one electrical service station on each of said skillets, and wherein said service station is connected to said cable such that when said conductor is in contact with at least one of said electrical receiving device, electrical current or data signals can travel from said conductor to said adjacent skillets, via contact between said first and second end connectors on said skillets in an approximately abutted relationship.

17. A conveyor system comprising:
    a plurality of skillets adapted to travel along a predetermined path;
    a first connector and a second connector on each of said skillets, said first and second connectors on each skillet capable of being electrically connected by a cable;
    an electrical receiving device on at least two of said plurality of skillets, said electrical receiving device on each of said at least two skillets in electrical communication with said first and second connectors and wherein said two electrical receiving devices are spaced a distance apart; and
    a conductor engaging at least one of said electrical receiving devices at any given time and wherein the conductor has predetermined length greater than said distance, said conductor capable of being electrically connected to said first and second connectors.

18. The conveyor system of claim 17 wherein said predetermined length is less than twice said distance.

19. The conveyor system of claim 17 wherein said first and second connectors are capable of transmitting data signals between said plurality of skillets.

* * * * *